United States Patent
Okuda

(10) Patent No.: US 7,653,487 B2
(45) Date of Patent: Jan. 26, 2010

(54) OBJECT DETECTION APPARATUS AND METHOD

(75) Inventor: Masato Okuda, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 649 days.

(21) Appl. No.: 11/539,356

(22) Filed: Oct. 6, 2006

(65) Prior Publication Data

US 2008/0086268 A1 Apr. 10, 2008

(51) Int. Cl.
- B60Q 5/00 (2006.01)
- B60W 30/08 (2006.01)
- G08G 1/16 (2006.01)
- G01S 3/808 (2006.01)
- G01S 15/93 (2006.01)
- B60W 30/06 (2006.01)

(52) U.S. Cl. .................. 701/301; 340/904; 340/436; 340/932.2; 367/127; 367/129; 367/118

(58) Field of Classification Search ......... 367/118–127, 367/129; 701/27, 300–302; 340/436, 904, 340/932.2
See application file for complete search history.

(56) References Cited

U.S. PATENT DOCUMENTS

| | | | | |
|---|---|---|---|---|
| 4,001,771 A | * | 1/1977 | Amrine et al. | 367/129 |
| 4,067,015 A | * | 1/1978 | Mogavero et al. | 340/825.7 |
| 4,965,775 A | * | 10/1990 | Elko et al. | 367/119 |
| 5,095,467 A | * | 3/1992 | Olson et al. | 367/125 |
| 5,729,507 A | * | 3/1998 | Massa et al. | 367/124 |
| 5,936,549 A | * | 8/1999 | Tsuchiya | 340/903 |
| 6,157,294 A | * | 12/2000 | Urai et al. | 340/436 |
| 6,819,284 B2 | | 11/2004 | Maier et al. | |
| 6,940,447 B2 | | 9/2005 | Voiglaender et al. | |
| 6,999,003 B2 | | 2/2006 | Matsukawa et al. | |
| 7,089,114 B1 | * | 8/2006 | Huang | 701/301 |
| 7,139,221 B1 | * | 11/2006 | Carter et al. | 367/125 |
| 7,515,506 B2 | * | 4/2009 | Szajnowski | 367/127 |

(Continued)

FOREIGN PATENT DOCUMENTS

DE 0305907 3/1989

*Primary Examiner*—Eric Bolda
*Assistant Examiner*—Ari M Diacou
(74) *Attorney, Agent, or Firm*—Gifford, Krass, Sprinkle, Anderson & Citkowski, P.C.

(57) ABSTRACT

A method and apparatus for determining the position of an object relative to a moving vehicle. While the vehicle is moving in a first direction, successive sensor pulses are transmitted from a vehicle sensor and toward the object. The echo or reflection from the sensor pulse is then received while a processor determines the transit time between the transmission of each pulse and the receipt of its echo. An angle factor is then calculated which represents the difference between the elapsed time of two sequential sensor pulses and the distance traveled by the vehicle between those two pulses. Whenever the absolute value of the angle factor exceeds a preset threshold, an angle is selected from a predefined lookup table contained in memory. Conversely, when the absolute value of the factor is less than the preset threshold, the angle is calculated as a function of the factor. The distance is then calculated between the sensor and the object as a function of the angle and the transit time for the sensor pulse and the appropriate signal is provided to the occupant of the vehicle.

24 Claims, 3 Drawing Sheets

U.S. PATENT DOCUMENTS

| | | |
|---|---|---|
| 2002/0005779 A1* | 1/2002 | Ishii et al. .................. 340/436 |
| 2003/0160717 A1 | 8/2003 | Mattes et al. |
| 2004/0125009 A1 | 7/2004 | Nishiguchi et al. |
| 2005/0035879 A1 | 2/2005 | Gotzig et al. |
| 2005/0122234 A1 | 6/2005 | Danz et al. |
| 2005/0156779 A1 | 7/2005 | Wixforth |
| 2005/0225439 A1 | 10/2005 | Watanabe et al. |
| 2006/0280032 A1* | 12/2006 | Szajnowski ................. 367/124 |
| 2007/0057816 A1* | 3/2007 | Sakakibara et al. ...... 340/932.2 |

* cited by examiner

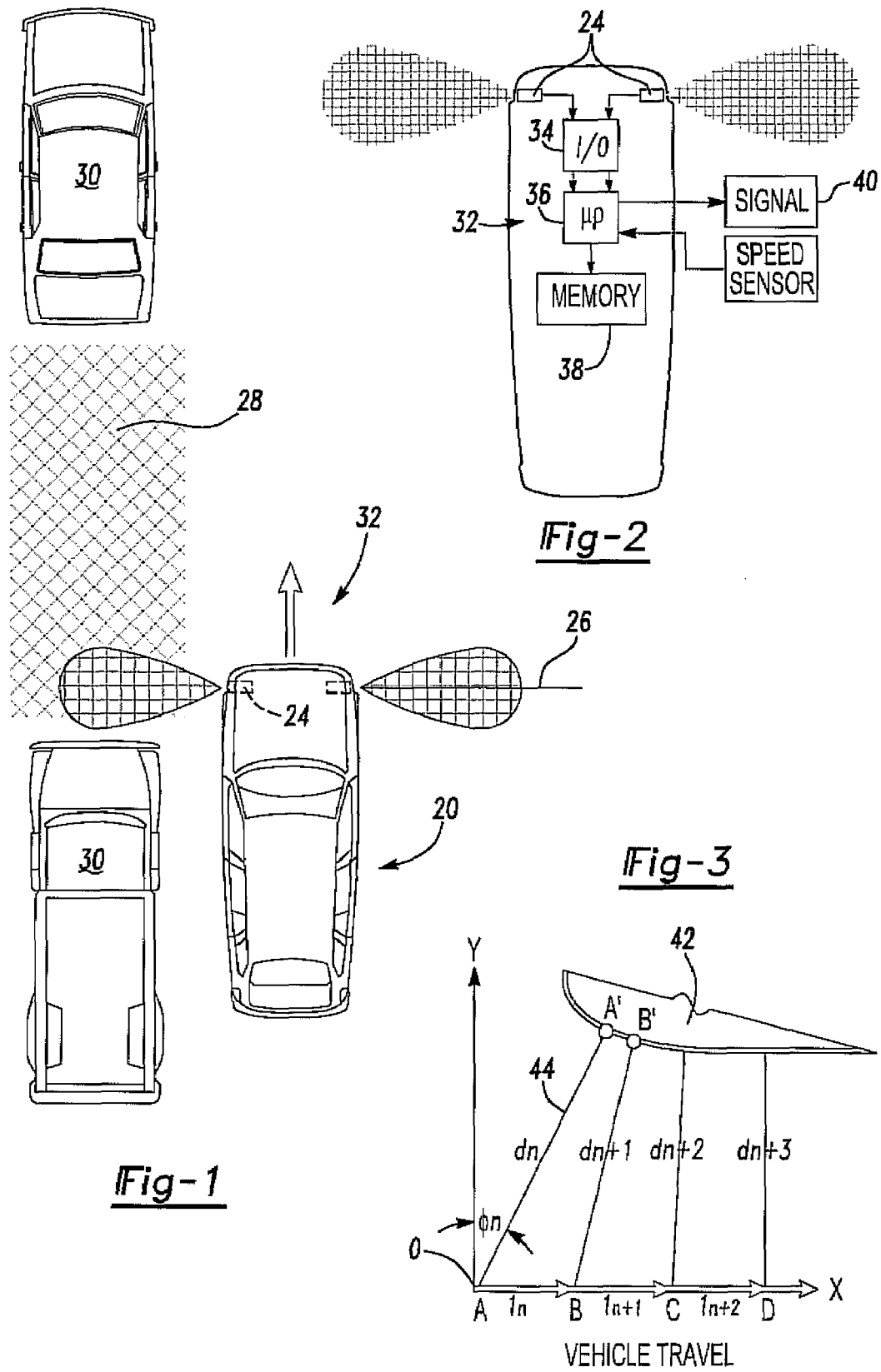

◇ Actual object points
□ Calculated object points by arcsine
△ Calculated object points by table look-up
○ Sonar location

OBJECT DETECTION APPARATUS AND METHOD

BACKGROUND OF THE INVENTION

I. Field of the Invention

The present invention relates generally to an object detection method and apparatus and, more particularly, to such an apparatus and method for use with an automotive vehicle.

II. Description of Related Art

There are many previously known patents in which one or more sensors are mounted to an automotive vehicle. These sensors generate sequential sensor pulses and, likewise, detect the reflection or echo of the pulse from a near object. Typically, the sensors are ultrasonic sensors.

Such sensors are particularly useful in automotive applications for assisting in parking of the automotive vehicle. For example, in previously known systems, ultrasonic sensors generate ultrasonic pulses laterally outwardly from both sides of the car. Any stationary object, such as a parked car, reflects the ultrasonic pulse back to the sensor from the closest perpendicular surface of the object. Consequently, the elapsed time between the transmission of each electronic pulse and the receipt of its reflection or echo from the stationary object directly corresponds to the distance between the motor vehicle and the closest perpendicular surface on the stationary object. In automotive parking assist systems the system provides the appropriate signal or alarm to the occupant of the motor vehicle of the distance between the motor vehicle and the stationary object.

One disadvantage of these previously known systems, however, is that, while such systems perform satisfactorily when the reflective surface of the stationary object is both aligned with and normal to the direction or axis of the sensor pulse, such systems suffer from inherent errors where the reflective surface of the stationary object is a curved surface with respect to the direction of the sensor pulse.

For example, when the direction of the reflection from the stationary object is significantly offset from the direction of the sensor axis, the distance between the sensor and the object is less than the distance calculated solely as a function of the elapsed time between the sensor pulse and receipt of its echo. Consequently, in order to protect the vehicle from collision with the stationary object, it has been the previous practice for such systems to include extra distance between the distance calculated from the elapsed time between the sensor pulse and receipt of its echo and the stationary object as a safety factor. This, however, disadvantageously limits the use of such systems in a cramped or close environment.

A still further disadvantage of these previously known systems is that in some cases the strength of the reflection from the perpendicular surface on the stationary object which is offset from the sensor axis may not be strong enough to exceed the threshold of the sensor. This, in turn, results in inaccuracies of the distance calculation between the stationary object and the sensor.

SUMMARY OF THE PRESENT INVENTION

The present invention provides both a method and apparatus for determining the position of an object relative to a moving vehicle which overcomes all of the above-mentioned disadvantages of the previously known devices.

In brief, while the vehicle is moving in a first direction, a vehicle sensor transmits successive sensor pulses from the vehicle toward any stationary objects that may be present. Preferably, the sensor pulses comprise ultrasonic pulses and are transmitted laterally outwardly from the vehicle and thus generally perpendicular to the direction of travel of the vehicle.

Following the transmission of each sensor pulse toward a near object, the sensor receives an echo or reflection of the sensor pulse from the nearest perpendicular surface on the object and then determines the elapsed time between the transmission of the sensor pulse and the receipt of its echo by the sensor, i.e. the sensor pulse transit time. This transit time is stored in digital memory.

After the transit time from at least two sequential sensor pulses has been determined, an angle factor is then computed by the system equal to the difference between the elapsed time of the two sequential sensor pulses divided by the distance traveled by the vehicle between those two sequential sensor pulses. Whenever that angle factor exceeds a predefined threshold, indicative that the angle between the echo reflection and the sensor axis is relatively large, the system selects an angle from a predefined lookup table contained in memory as a function of the angle factor. Conversely, when the angle factor is less than that predefined threshold, the system computes the angle as a function of the arcsine of the angle factor.

After the angle is determined, either from the lookup table or through calculation of the arcsine, the system then calculates the distance between the sensor and the object as a function of the angle and the transit time of the sensor pulse. This calculation is then conveyed to the vehicle occupant through any appropriate signal, such as an audible signal, visual display and/or the like.

The radius of curvature of the object may be optionally calculated by measuring sequential points along the object relative to the sensor. The radius of curvature may then be conveyed to the vehicle occupant as desired, e.g. by displaying the object on a display screen.

If even further greater accuracy for determining the distance between the sensor and the stationary object is desired, an error term may be calculated as a function of the difference between the angle between the sensor axis and the echo axis for two sequential measurements.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a plan diagrammatic view illustrating a preferred embodiment of the present invention;

FIG. 2 is a block diagrammatic view illustrating a preferred embodiment of the present invention;

FIG. 3 is a diagrammatic view illustrating the operation of the present invention;

DETAILED DESCRIPTION OF A PREFERRED EMBODIMENT OF THE PRESENT INVENTION

Figure 4:
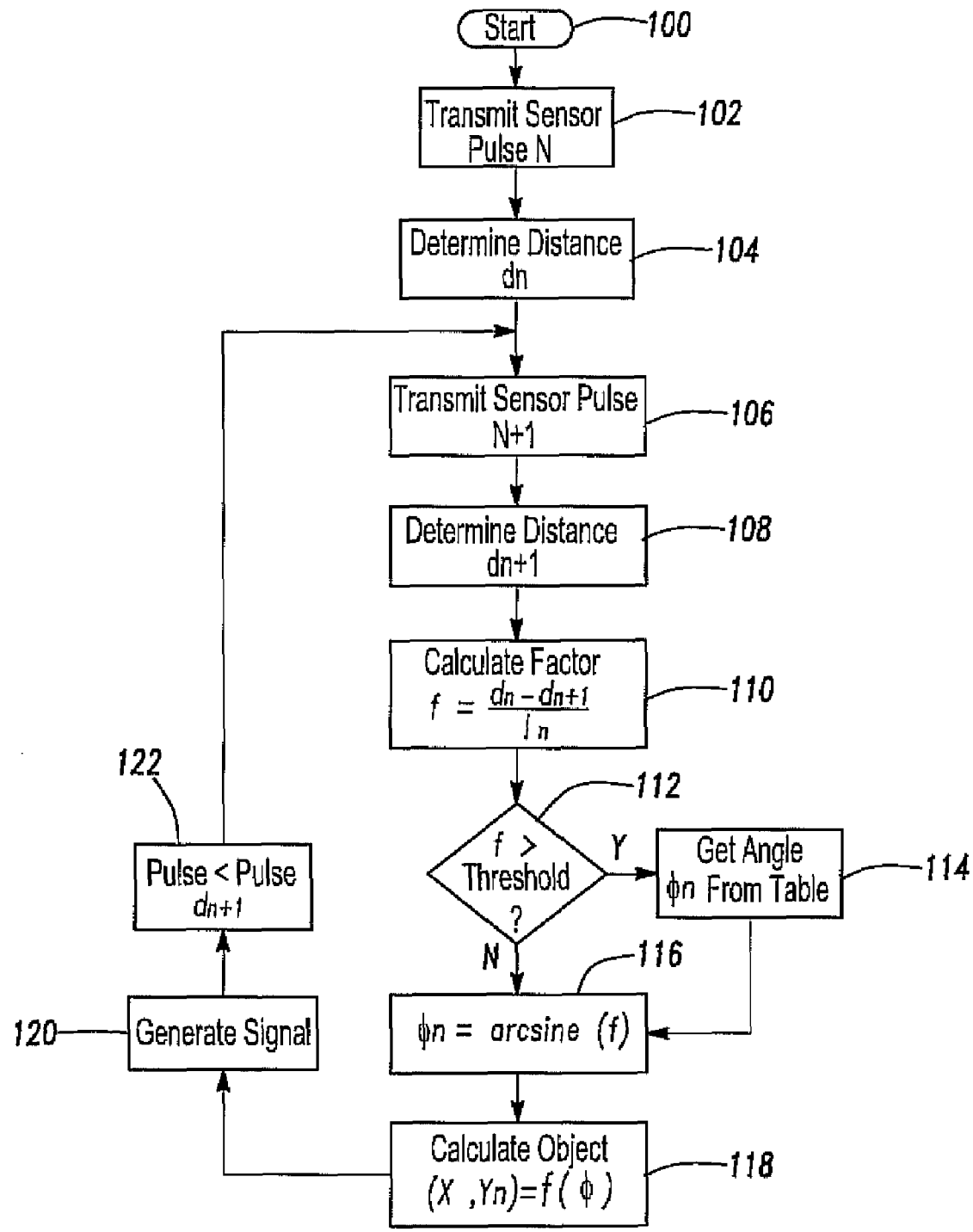
FIG. 4 is a flowchart illustrating a preferred embodiment of the present invention.

With reference first to FIG. 1, an exemplary application of the object detection method and system 32 of the present invention is shown for use with an automotive vehicle 20. The automotive vehicle 20 has a direction of travel 32 and at least one sensor 24. The sensor 24 is preferably an ultrasonic sensor and generates a series of sequential ultrasonic pulses in a direction laterally outwardly from the vehicle 20 so that the sonic pulses 26 each have a sensor axis 26 which is lateral with respect to the direction of travel 22 for the vehicle 20. The sensor axis, furthermore, does not have to have a fixed value and may vary under different weather or temperature conditions. Each sensor 24 also receives the echo or reflection of the sensor pulses. Furthermore, although the system 32 has a variety of applications, in one application the sensor 24 is used to detect a parking space 28 between stationary objects 30, such as parked cars.

With reference now to FIG. 2, a block diagrammatic view of a preferred embodiment of the object detecting system 32 of the present invention is shown. Each sensor is coupled through an input/output block 34 as input/output signals to a microprocessor 36. The microprocessor 36 has access to computer memory 38 in order to store and retrieve the data signals received from the sensors 24, as well as calculations performed by the microprocessor 36. Additionally, the microprocessor 36 is coupled to a conventional signaling device 40 which may be an audio device or a screen display.

With reference now to FIG. 37 an exemplary stationary object 42 is shown which has a curved surface 44. As illustrated in FIG. 3, the Y axis represents the actual distance between the stationary object 42 and the sensor 24 which is positioned at Y=0. In addition, the X axis in FIG. 3 represents the direction of travel 22 for the automotive vehicle 20. This direction is generally normal to the axis of the pulses emitted by the sensor 24.

When the sensor is at position A, the sensor generates a sensor pulse. This pulse is then reflected by the nearest perpendicular surface A' on the object 42 and the reflected echo travels back along axis 44 to the sensor at point A. The transit time $d_n$ between the transmission of the sensor pulse while the sensor is at position A and the reflected echo from surface A' is proportional to the distance between point A', the stationary object 42 and the sensor 24.

The transit time only gives the distance $d_n$. Our aim is to calculate the angle $\phi_n$ so that the location of the reflection point A' can be determined. As the vehicle 20, and thus the sensor 24, travels in the positive X direction to position B, the sensor 24 generates another sensor pulse toward the object 42. That sensor pulse is reflected from the nearest perpendicular surface B' on the stationary object 42 back to the sensor at position B. The transit time for this second pulse is proportional to the distance $d_{n+1}$. Similarly, as the vehicle and sensor continue to travel along the vehicle path, the sensor 24 generates further sensor pulses at positions C and D which likewise result in transit times for the distances $d_{n+2}$ and $d_{n+3}$, respectively. Furthermore, the distance traveled by the sensor between points A and B is represented as $l_n$ while the distance between points B and C is represented as $l_{n+1}$ and, similarly, $l_{n+2}$ for the distance between points C and D. The distances $l_n$, $l_{n+1}$, etc. are determined from any conventional vehicle sensor 43 (FIG. 2) indicative of the vehicle speed and steering angle.

Once the elapsed time for the sensor pulse between two sequential sensor pulses has been measured, it is possible to determine or at least approximate the value of $\phi$ in accordance with the following formula:

$$\varphi n = \arcsin\left(\frac{d_n - d_{n+1}}{l_n}\right) \quad \text{Equation 1}$$

Consequently, once the value of $\phi_n$ is calculated and the transit time or distance $d_n$ previously determined, it is straightforward to calculate the actual distance between the vehicle and the surface A' of the stationary object 42, i.e. the Y distance between the surface A' on the stationary object 42 and the vehicle, using conventional trigonometry.

As the angle $\phi_n$ increases, and consequently, the fraction $d_n - d_{n+1}/l_n$ increases, past a certain threshold, the accuracy of the calculation of the position of the surface 44 of the stationary object 42 becomes less reliable for a number of reasons. For example, the strength of the sensor pulses at greater angles of $\phi$ are more than sensor pulses that are reflected perpendicularly back to the sensor so that the reflection from the nearest perpendicular surface of the stationary object 42 at a relatively large angle $\phi$ may be below the sensitivity threshold of the sensor. This, in turn, will result in error in the calculations for the position of the surface 44 of the stationary object 42.

Consequently, whenever the absolute value of the angle factor $$\left(\frac{d_n - d_{n+1}}{l_n}\right)$$

exceeds a preset value, e.g. 0.54, increased accuracy for the overall system is obtained by selecting the value of $\phi$ from a predefined lookup table contained in memory 38 (FIG. 2), rather than by calculating $\phi$ by taking the arcsine of the angle factor. One example of such a table is illustrated below:

Calculation Lookup Table

| (dn − dn + 1)/ln | φ |
| --- | --- |
| −1.01 | −0.71 |
| −0.87 | −0.70 |
| −0.80 | −0.69 |
| −0.72 | −0.68 |
| −0.66 | −0.65 |
| −0.62 | −0.63 |
| −0.58 | −0.60 |
| −0.54 | −0.57 |
| 0.54 | 0.57 |
| 0.58 | 0.60 |
| 0.62 | 0.63 |
| 0.66 | 0.65 |
| 0.72 | 0.68 |
| 0.80 | 0.69 |
| 0.87 | 0.70 |
| 1.01 | 0.71 |

Figure 5:
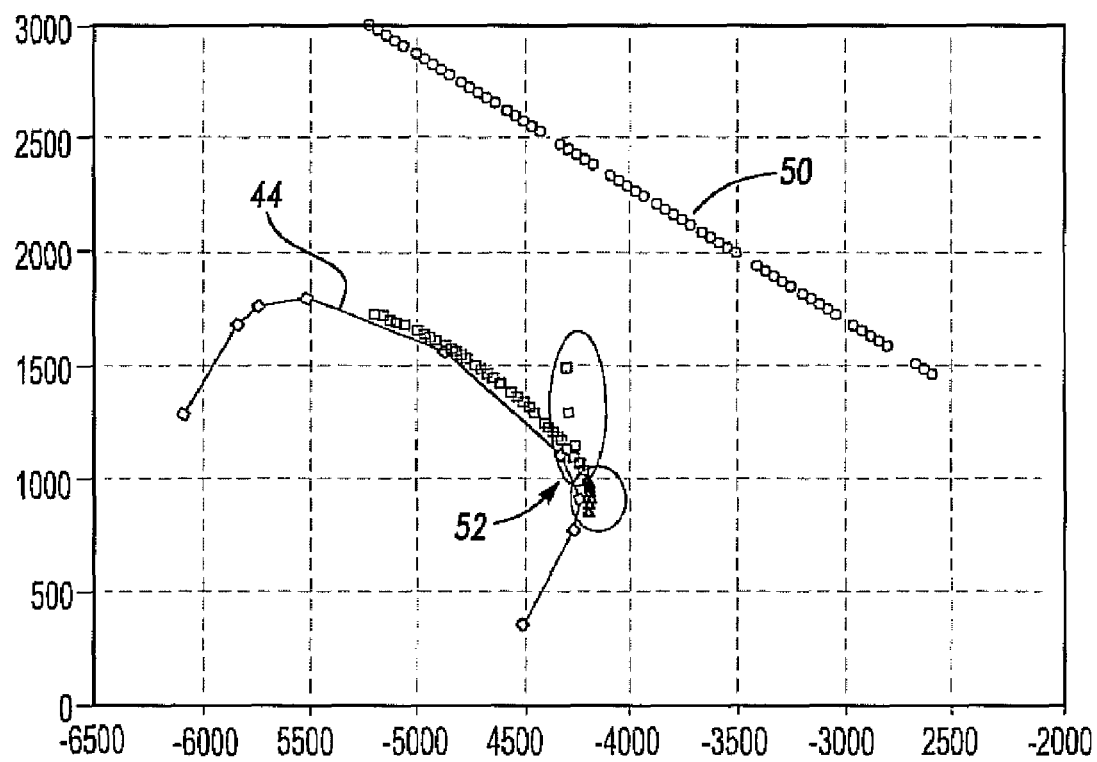
FIG. 5 is a graph depicting the operation of the preferred embodiment of the present invention.

By utilizing the values of $\phi$ from the lookup table that are predefined and stored in the computer memory 38 (FIG. 2) whenever the absolute value of the angle factor $$\frac{d_n - d_{n+1}}{l_n}$$

exceeds a threshold, e.g. 0.54, increased accuracy of the position of the object surface 44 may be obtained. In this regard, see FIG. 5 which illustrates an exemplary plot of the object surface 44 with respect to the travel of the sensor illustrated by line 50. As illustrated in FIG. 5, in the area 52 of the stationary object surface 44 where the angle between the object surface 44 and the path of travel of the sensor is relatively great, the selection of the angle φ from the lookup table as opposed to calculation of the position by Equation 1 illustrates the enhanced accuracy of the position location system of the present invention.

It will be understood, of course, that the precise value of the angle factor used as the threshold to select φ from the table lookup will vary from one vehicle to another, from one sensor to another and that the value of 0.54 is utilized for exemplary purposes only. Preferably, the value of the threshold of the angle factor to select φ from the lookup table is determined empirically.

In the case where the value of the angle factor is above the predetermined threshold, e.g. 0.54, but in between two values contained in the lookup table, the value of φ is determined by interpolation between those two values in the lookup table.

After the angle is determined either by calculation or by using the lookup table, the distance between the sensor 24 and object is calculated and the appropriate signal is provided to the laser on the signal device 40 (FIG. 2).

With reference now to FIG. 4, a simplified flowchart is illustrated depicting the operation of the system of the present invention. The system is first initiated at step 100 which then proceeds to step 102 where the processor controls the sensors 24 to generate the first output pulse N. Step 102 then continues to step 104.

At step 104, the microprocessor determines the distance $d_n$ between the sensor and the perpendicular surface from an object. Since the distance $d_n$ is directly proportional to the transit time of the first pulse N, it is not necessary to actually calculate the distance $d_n$ between the sensor and the stationary object. Instead, the transit time of the first pulse N may be used as representative of the distance $d_n$. Step 104 then continues to step 106.

At step 106, the system transmits a second pulse N+1. Step 106 then proceeds to step 108 where the distance $d_{n+1}$ is determined from the transit time of the second pulse N+1. Step 108 then proceeds to step 110.

At step 110, the angle factor f is calculated in accordance with Equation 1. Step 110 then proceeds to step 112.

At step 112, the absolute value of the angle factor f is compared with a preset threshold. If the absolute value of the angle factor f is greater than the threshold, step 112 branches to step 114 where the angle $\phi_n$ is determined either directly from the lookup table or by interpolation of the lookup table. Step 114 then proceeds to step 118.

Conversely, if the absolute value of the angle factor f is less than the threshold, step 112 instead proceeds to step 116 where the angle $\phi_n$ is determined as a function of the arcsine of the angle factor f. Step 116 then proceeds to step 118.

At step 118, the position of the object, and thus the distance between the sensor and the object, is calculated as a function of $\phi_n$ which is determined either from the lookup table at step 114 or calculated at step 116. Step 118 then proceeds to step 120 where the processor 36 generates the appropriate signal to the signal device 40 for use by the user of the system. Step 120 then proceeds to step 122.

At step 122, the system replaces the value $d_n$ with the value $d_{n+1}$. Step 122 then branches back to step 106 where the above process is iteratively repeated.

In some situations, it is desirable to measure the radius of curvature of the stationary object 42. Using conventional trigonometry equations, the value of the radius of curvature may be determined by the following equation:

$$R_n = \frac{d_{n+1}\cos\varphi_{n+1} - d_n\cos\varphi_n}{\cos\varphi_n - \cos\varphi_{n+1}} \quad \text{Equation 2}$$

In some situations, the precise measurement of the position of the curved surface is less accurate than desirable. For example when the stationary object has a very small radius of curvature, the sensor measurement frequency is slow or the sensor moving speed is fast, the calculation of the sine of φ for each point may be enhanced by including an error term as shown by Equation 3 below:

$$\sin\varphi_n = \frac{d_n - d_{n+1}}{1_n} + \frac{\varphi_n - \varphi_{n+1}}{2}\cos\varphi_n \quad \text{Equation 3}$$

Once the sine of φ is determined, the value of φ can be determined by taking the arcsine of this value.

From the foregoing, it can be seen that the present invention provides both a method and apparatus for determining the position of an object relative to a moving vehicle which enjoys enhanced accuracy over previously known systems. Having described my invention, however, many modifications thereto will become apparent to those skilled in the art to which it pertains without deviation from the spirit of the invention as defined by the scope of the appended claims.

I claim:

1. A method for determining the position of an object relative to a moving vehicle comprising the steps of:
   while the vehicle is moving in a first direction, transmitting successive sensor pulses from a vehicle sensor toward the object,
   receiving an echo of each sensor pulse,
   determining a transit time between the transmission of each pulse and the receipt of its echo by the sensor,
   determining an angle factor as a function of the difference between the transit times of two sensor pulses and the distance traveled by the vehicle between said two sensor pulses,
   selecting an angle from a predefined table whenever the absolute value of the angle factor exceeds a preset threshold,
   calculating the angle as a function of said factor whenever the absolute value of the factor is less than the preset threshold,
   calculating the distance between the sensor and the object as a function of said angle and the transit time for the sensor pulse,
   generating a signal as a function of said distance calculating step,
   wherein the angle factor equals the ratio of the difference of the perpendicular distances between the sensor and the object over successive pulses divided by the distance traveled by the vehicle over time between said successive pulses.

2. The invention as defined in claim 1 wherein said sensor generates said sensor pulses in a direction substantially normal to said first direction.

3. The invention as defined in claim 1 wherein said sensor is an ultrasonic sensor.

4. The invention as defined in claim 1 wherein said angle calculating step comprises calculating the arcsine of said factor.

5. The invention as defined in claim 1 and further comprising the step of providing a signal to the vehicle representative of the calculated distance.

6. The invention as defined in claim 1 and further comprising the step of calculating a radius of curvature of the object as a function of the calculated distance of at least two sequential sensor pulses.

7. The invention as defined in claim 1 wherein said step of selecting the angle from the predefined table comprises the step of interpolating between two sequential angles in said table.

8. The invention as defined in claim 1 and further comprising the step of calculating an error term as a function of the difference between the angles of two sequential sensor pulses, and adding the error term to the angle prior to said distance calculating step.

9. A method for determining the position of an object relative to a moving vehicle comprising the steps of:
   while the vehicle is moving in a first direction, transmitting successive sensor pulses from a vehicle sensor in a second direction substantially normal to said first direction toward the object,
   receiving an echo of each sensor pulse along, said echo traveling in a third direction,
   determining a transit time between the transmission of each pulse and the receipt of its echo by the sensor,
   determining an angle factor as a function of the difference between the transit times of two sensor pulses and the distance traveled by the vehicle between said two sensor pulses,
   selecting an angle corresponding to the angle between said second and third directions from a predefined table whenever the absolute value of the angle factor exceeds a preset threshold,
   calculating said angle as the arcsine of said angle factor whenever the absolute value of the factor is less than the preset threshold,
   calculating the distance between the sensor and the object as a function of said angle and the transit time for the sensor pulse,
   generating a signal as a function of said distance calculating step,
   wherein the angle factor equals the ratio of the difference of the perpendicular distances between the sensor and the object over successive pulses divided by the distance traveled by the vehicle over time between said successive pulses.

10. The invention as defined in claim 9 wherein said sensor generates said sensor pulses in a direction substantially normal to said first direction.

11. The invention as defined in claim 9 wherein said sensor is an ultrasonic sensor.

12. The invention as defined in claim 9 wherein said angle calculating step comprises calculating the arcsine of said factor.

13. The invention as defined in claim 9 and further comprising the step of providing a signal to the vehicle representative of the calculated distance.

14. The invention as defined in claim 9 and further comprising the step of calculating a radius of curvature of the object as a function of the calculated distance of at least two sequential sensor pulses.

15. The invention as defined in claim 9 wherein said step of selecting the angle from the predefined table comprises the step of interpolating between two sequential angles in said table.

16. The invention as defined in claim 9 and further comprising the step of calculating an error term as a function of the difference between the angles of two sequential sensor pulses, and adding the error term to the angle prior to said distance calculating step.

17. Apparatus for determining the position of an object relative to a moving vehicle comprising:
   means for transmitting successive sensor pulses from a vehicle sensor toward the object while the vehicle is moving in a first direction,
   means for receiving an echo of each sensor pulse,
   means for determining a transit time between the transmission of each pulse and the receipt of its echo by the sensor,
   means for determining an angle factor as a function of the difference between the transit times of two sensor pulses and the distance traveled by the vehicle between said two sensor pulses,
   means for selecting an angle from a predefined table whenever the absolute value of the angle factor exceeds a preset threshold,
   means for calculating the angle as a function of said angle factor whenever the absolute value of the angle factor is less than the preset threshold,
   means for calculating the distance between the sensor and the object as a function of said angle and the elapsed time for the sensor pulse,
   means for generating a signal as a function of the calculated distance between said sensor and said object,
   wherein the angle factor equals the ratio of the difference of the perpendicular distances between the sensor and the object over successive pulses divided by the distance traveled by the vehicle over time between said successive pulses.

18. The invention as defined in claim 17 wherein said sensor generates said sensor pulses in a direction substantially normal to said first direction.

19. The invention as defined in claim 17 wherein said sensor is an ultrasonic sensor.

20. The invention as defined in claim 17 wherein said means for calculating said angle comprises means for calculating the arcsine of said factor.

21. The invention as defined in claim 17 and further comprising means for providing a signal to the vehicle representative of the calculated distance.

22. The invention as defined in claim 17 and further comprising means for calculating a radius of curvature of the object as a function of the calculated distance of at least two sequential sensor pulses.

23. The invention as defined in claim 17 wherein said means for selecting the angle from the predefined table comprises means for interpolating between two sequential angles in said table.

24. The invention as defined in claim 17 and further comprising means for calculating an error term as a function of the difference between the angles of two sequential sensor pulses, and means for adding the error term to the angle prior to calculating said distance.

* * * * *

UNITED STATES PATENT AND TRADEMARK OFFICE
CERTIFICATE OF CORRECTION

| | | |
|---|---|---|
| PATENT NO. | : 7,653,487 B2 | Page 1 of 1 |
| APPLICATION NO. | : 11/539356 | |
| DATED | : January 26, 2010 | |
| INVENTOR(S) | : Okuda | |

It is certified that error appears in the above-identified patent and that said Letters Patent is hereby corrected as shown below:

Title Page, should read (*) Notice: Subject to any disclaimers, term of this patent is extended or adjusted under 35 U.S.C. 154(b) by 761 days.

Column 3, line 22 replace "37" with --3--

Signed and Sealed this

Third Day of August, 2010

David J. Kappos
*Director of the United States Patent and Trademark Office*